US012608306B2

(12) United States Patent　　　　(10) Patent No.:　US 12,608,306 B2
Kachare et al.　　　　　　　　　　(45) Date of Patent:　Apr. 21, 2026

(54) SYSTEMS AND METHODS FOR DEMAND-BASED STORAGE

(71) Applicant: Samsung Electronics Co., Ltd., Suwon-si (KR)

(72) Inventors: Ramdas Kachare, Pleasanton, CA (US); Hingkwan Huen, Daly City, CA (US); Luis Vitorio Cargnini, San Jose, CA (US); Hrishikesh Sathawane, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/233,587

(22) Filed: Aug. 14, 2023

(65) Prior Publication Data

US 2024/0419585 A1　　Dec. 19, 2024

Related U.S. Application Data

(60) Provisional application No. 63/521,292, filed on Jun. 15, 2023.

(51) Int. Cl.
　　　*G06F 12/02*　　　　(2006.01)
　　　*G06F 21/44*　　　　(2013.01)
(52) U.S. Cl.
　　　CPC .......... *G06F 12/0246* (2013.01); *G06F 21/44* (2013.01); *G06F 2212/7201* (2013.01)
(58) Field of Classification Search
　　　CPC ..................... G06F 12/0246; G06F 2212/7201
　　　See application file for complete search history.

(56) References Cited

U.S. PATENT DOCUMENTS

| | | | |
|---|---|---|---|
| 6,839,815 B2 | 1/2005 | Kagami et al. | |
| 9,559,938 B2 | 1/2017 | Abrams et al. | |
| 9,805,349 B1 | 10/2017 | Chang | |
| 10,439,870 B2 | 10/2019 | Chen et al. | |
| RE49,127 E | 7/2022 | Roden et al. | |
| 2007/0043667 A1 | 2/2007 | Qawami et al. | |
| 2013/0332418 A1* | 12/2013 | Kim | G06F 16/1858 |
| | | | 707/625 |
| 2016/0077975 A1* | 3/2016 | Stabrawa | G06F 3/0631 |
| | | | 711/209 |
| 2016/0342344 A1* | 11/2016 | Kankani | G06F 12/02 |
| 2018/0284990 A1 | 10/2018 | Kachare et al. | |

(Continued)

FOREIGN PATENT DOCUMENTS

CN　　　110298677 B　　8/2021

*Primary Examiner* — Nicholas A. Paperno

(74) *Attorney, Agent, or Firm* — Womble Bond Dickinson (US) LLP

(57) ABSTRACT

Systems and methods for demand-based storage are disclosed. A first storage device is configured to receive a first request for a first storage capacity. The first storage device may transmit a second request for allocating at least a portion of the first storage capacity on a second storage device. The first storage device and the second storage device may communicate with each other over a second link. The first storage device may receive a first storage command from the first computing device and generate a second storage command based on the first storage command. The first storage device may transmit the second storage command to the second storage device for execution of the second storage command by the second storage device.

20 Claims, 7 Drawing Sheets

(56) References Cited

U.S. PATENT DOCUMENTS

| | | | |
|---|---|---|---|
| 2019/0146675 A1* | 5/2019 | Subramanian | ........... G06F 3/06 |
| | | | 711/170 |
| 2019/0227718 A1* | 7/2019 | Frolikov | ............. G06F 12/0246 |
| 2023/0043336 A1* | 2/2023 | Mitkar | ................. G06F 3/0631 |

* cited by examiner

SYSTEMS AND METHODS FOR DEMAND-BASED STORAGE

CROSS-REFERENCE TO RELATED APPLICATION(S)

The present application claims priority to and the benefit of U.S. Provisional Application No. 63/521,292, filed Jun. 15, 2023, entitled "SYSTEM AND METHOD FOR STORAGE ON DEMAND," the entire content of which is incorporated herein by reference.

FIELD

One or more aspects of embodiments according to the present disclosure relate to storage systems, and more particularly to systems and methods for providing scalable storage.

BACKGROUND

With increasing demand for storing and processing a large amount of data in a reasonable time, it may be important to select a storage device that provides the appropriate amount of storage capacity in a cost-efficient manner. The storage capacity requirements for a host, however, may change and fluctuate often. A traditional storage device with a fixed storage capacity, therefore, may not be a suitable solution in fulfilling the changing capacity requirements for the host.

The above information disclosed in this Background section is only for enhancement of understanding of the background of the present disclosure, and therefore, it may contain information that does not form prior art.

SUMMARY

One or more embodiments of the present disclosure are directed to a first storage device coupled to a first computing device over a first link. The first storage device includes a storage medium and a processing circuit connected to the storage medium. The processing circuit may be configured to: receive a first request for a first storage capacity; transmit a second request for allocating at least a portion of the first storage capacity on a second storage device configured to communicate with the first storage device over a second link; receive a first storage command from the first computing device; generate a second storage command based on the first storage command; and transmit the second storage command to the second storage device for execution of the second storage command by the second storage device.

According to some embodiments, the first storage device includes a solid state drive (SSD), and the first link includes a data communication bus.

According to some embodiments, the second storage device is shared with the first computing device and a second computing device, and the second link includes a connection to a network fabric.

According to some embodiments, the processing circuit is further configured to: receive an address of the second storage device based on the second request, wherein the processing circuit being configured to transmit the second storage command includes the processing circuit being configured to transmit the second storage command based on the address.

According to some embodiments, the first storage device and the second storage device are configured to communicate with a server, wherein the server is configured to:

receive a communication associated with the first computing device; generate a profile based on the communication; and detect allocation of the first storage capacity to the first computing device based on the profile.

According to some embodiments, the processing circuit is configured to: detect an amount of use of the at least the portion of the first storage capacity; and transmit the amount of use to the server, wherein the server is configured to generate a second communication based on the amount of use.

According to some embodiments, the processing circuit is configured to: receive a second request for a second storage capacity different from the first storage capacity; and compute a second charge amount for the second storage capacity.

According to some embodiments, the processing circuit is configured to transmit the second request to a server. The server may be configured to: authenticate the first computing device; and select the second storage device for allocating the first storage capacity on the second storage device for use by the first computing device.

According to some embodiments, the server is configured to communicate with a third storage device, wherein the server is configured to select the second storage device and the third storage device for allocating the first storage capacity on the second storage device and the third storage device.

According to some embodiments, the processing circuit is configured to provide information on accessible storage capacity to the first computing device that is larger than a size of the storage medium.

According to some embodiments, the first storage command includes a logical address, and the processing circuit is configured to map the logical address to a physical address in the second storage device.

According to some embodiments, the processing circuit is configured to: receive data associated with the first storage command; store the data in the storage medium; and transmit the data from the storage medium to the second storage device.

According to some embodiments, the processing circuit is configured to provide a function including at least one of a quality of service function, a redundant array of independent disks (RAID) scheme, data security function, data processing function, acceleration function, data snapshot function, data replication function, or data migration function.

According to some embodiments, the processing circuit is configured to: receive a second request for a second storage capacity; make an authentication determination for the first computing device; and generate a signal for the second request based on the authentication determination.

One or more embodiments of the present disclosure are also directed to a method that includes: receiving, by a first storage device, over a first link, a first request for a first storage capacity; transmitting, by the first storage device, a second request for allocating at least a portion of the first storage capacity on a second storage device configured to communicate with the first storage device over a second link; receiving, by the first storage device, a first storage command from a first computing device; and generating, by the first storage device, a second storage command based on the first storage command; and transmitting, by the first storage device, the second storage command to the second storage device for execution of the second storage command by the second storage device.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
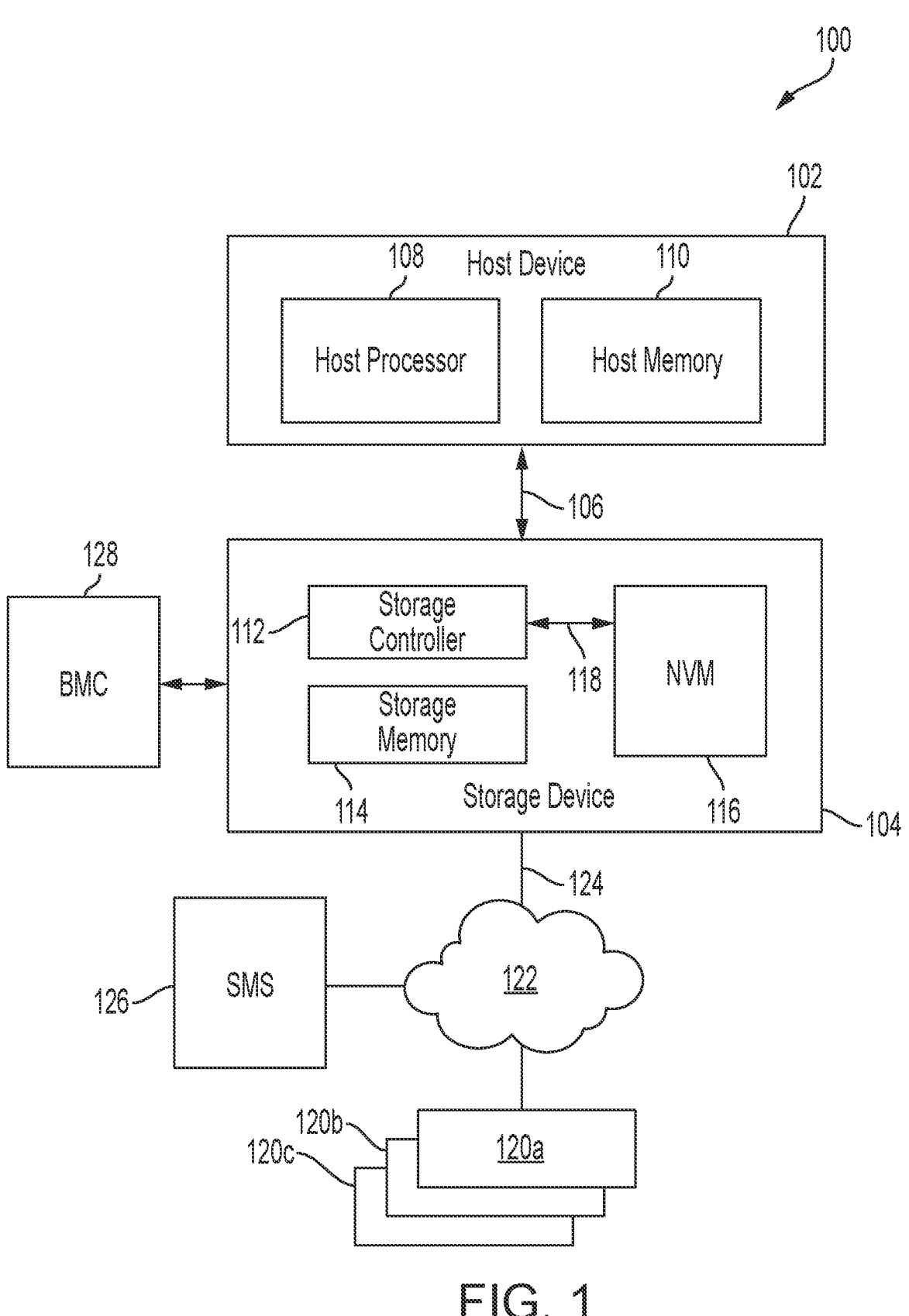
FIG. 1 depicts a block diagram of a storage system according to one or more embodiments.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Embodiments of the present disclosure are described below with reference to block diagrams and flow diagrams. Thus, it should be understood that each block of the block diagrams and flow diagrams may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flow diagrams. Accordingly, the block diagrams and flow diagrams support various combinations of embodiments for performing the specified instructions, operations, or steps.

A Directly Attached Storage (DAS) system architecture may provide fixed storage capacity that may lead to inefficiencies to storage utilization. The fixed storage capacity may be smaller or larger than the actual storage capacity needed by a host device. Although storage systems such as a remote direct attach storage (RDAS) system may allow scaling of storage capacity by using a disaggregated storage architecture, the host device may carry the burden of network processing for storage accesses.

In general terms, embodiments, of the present disclosure are directed to systems and methods for a demand-based storage device that may scale up and down based on the demands of a host device. In some embodiments, the systems of methods for scalable storage may provide the benefits of a DAS, while also enabling scalability of the storage capacity via a disaggregated, flexible, and/or dissociative storage.

Applications that are increasingly operating with Internet-of-Things (IoT) devices, social networks, autonomous vehicles, robotic devices, and other emerging and consolidated technologies, produce and process large amounts of data. The increasing amounts of data may create a need for higher capacity storage. One type of storage solution that may be employed may be a Directly Attached Storage (DAS) system architecture. A storage device in the DAS system architecture may be directly attached to a central processing unit (CPU) of a host running an application. The storage device may be, for example, a solid state drive (SSD) connected to the CPU over a Peripheral Component Interconnect Express (PCIe) interface. The protocol employed by the interface may be, for example, a Non Volatile Memory Express (NVMe) protocol, or other similar, protocol.

The NVMe SSD in the DAS system may store data by dividing it into blocks of equal sizes. The data blocks may be programmed on an underlying physical storage media (e.g., NAND flash) in the manner that is optimized for quick access. An NVMe SSD may thus provide good latency and throughput performance for an application. A drawback of the DAS system, however, may be that the attached storage device comes with a fixed storage capacity that may create barriers to scaling. For example, if more storage capacity is needed, the currently installed storage device may need to be replaced and/or new devices may need to be added. This process may thus result in server downtime and, thus, loss of productivity and potential disruption to user experience. In addition, the number of storage devices that may physically fit into the system may be limited. Thus, the maximum capacity that may be provided by the DAS system may be limited by the allowable maximum number of storage devices.

Another type of storage solution that may be employed may be a disaggregated storage in the form of remote storage behind a network. The disaggregated storage may be provided by a Storage Area Network (SAN), or a file server with Network-Attached Storage (NAS). One benefit of disaggregation may be that storage can be scaled out with minimal disruption to the application server. Maximum capacity may be unlimited, too. However, disaggregated storage may create network processing overhead for the host CPU, and an increase in the overall complexity of the system.

Another type of storage solution may be a remote direct attach storage (RDAS) architecture. Similar to SAN and NAS, the RDAS architecture may provide disaggregated storage by managing the storage centrally over the network, and sharing the storage with multiple hosts. The RDAS architecture may share the benefits of storage disaggregation.

The RDAS architecture may use NVMe over Fabric (NVMe-oF), which is a transport mapping mechanism for NVMe commands and responses over the network, replacing the PCIe. Data exchange between networked computers may be achieved without involving the processors, by using common transport bindings such as fiber channel (NVMe/FC), TCP (NVMe/TCP), and RDMA supporting InfiniBand, Converged Ethernet (RoCE), or Internet Wide Area RDMA Protocol (iWARP).

Although use of NVMe-OF may produce lower latency that higher performance speeds by bypassing a traditional data path, the application server side may need dedicated hardware and configurations to handle the network transport, adding overall system complexity and reducing the overall benefits of the RDAS architecture. Implementing NVMe-oF on CPU can also reduce usable CPU cycles available for applications.

In some embodiments, a demand-based (also referred to as on-demand) storage device is provided that may provide the benefits of an NVMe-based DAS, while also enabling scalability of the storage capacity via a disaggregated, flexible, and/or dissociative storage.

In some embodiments the on-demand storage device may be referred to, for ease of description as a storage on demand SSD (SoD-SSD), although embodiments are not limited to SSDs, and may include other types of persistent storage. In some embodiments, the SoD-SSD appears as a traditional DAS SSD to the host. The host may interact with the SoD-SSD to provide I/O and administrative commands via a storage interface and protocol as it would with a typical DAS SSD.

Unlike a traditional DAS SSD, however, the SoD-SSD is enhanced to give access to the host, storage capacity that is above and beyond the capacity provided by the physical storage in the SoD-SSD. In this regard, storage is not be limited based on the physical limit of the storage medium.

In some embodiments, storage capacity is provided to the host by one or more remote storage devices that are coupled to the SoD-SSD over a network. The storage capacity that is requested by the host may be provided by the one or more of the remote storage devices, through the SoD-SSD, in a manner that is transparent to the host. The host may transmit a request to read or write data to a logical address, and the physical location where the data is stored may be hidden from the host.

In some embodiments, the storage capacity that is provided to the host is based on a subscribed SoD service plan. A storage management server (SMS) may provide and manage subscription services for the host (e.g., a client or user associated with the host). For example, the storage management server may interact with a storage administrator to enroll the client in a SoD service plan. In some embodiments, the SoD service plan is a "pay-as-you-go" plan, where the host uses and pays for the storage that it uses, on demand, on an as-needed-basis.

In some embodiments, the SoD service plan provides the host with a specific storage capacity. The SoD-SSD may be confined to the specific storage capacity that has been selected (e.g., 100 GB/day). The storage management server may charge the client (e.g., on a monthly basis), for the fixed storage capacity.

In some embodiments, the storage management server provides details of the allocated capacity (e.g., connection details including a network address of the storage device providing the requested capacity), to the SoD SSD. The SoD-SSD may use the details to read and write data from and to the allocated storage device.

In some embodiments, the storage management server is configured to provide authentication and administrative functions. For example, the server may be configured to authenticate the SoD-SSD device transmitting a request for storage capacity. In this regard, the server may maintain a user account (also referred to as a profile) with the user's subscription information, pricing information, service level agreement (SLA), and/or the like. The storage management server may charge the user based on the amount of storage capacity allocated or used by the host, according to the information in the user account.

In some embodiments, the SoD-SSD includes a mapping of the logical addresses used by the host, to physical addresses in one or more of the remote storage devices. In some embodiments, access of the user's subscription information and/or the visibility of the layout of data in the remote storage devices allows the SoD-SSD to perform one or more functions related to data storage, that may be in addition to typical read and write operations. For example, the SoD-SSD may provide quality of service (QOS) on the basis of the user's subscription, service level agreements, and/or the like. In another example, the SoD-SSD may implement a redundant array of independent disks (RAID) scheme such as RAID0, RAID1, RAID5, RAID6, RAID10, and/or the like. The SoD-SSD may also perform data security function such as Key Per IO (KPIO), transport layer security (TLS), and/or the like.

The SoD-SSD may also perform various computational storage functions such as compression, checksums, acceleration, and/or offload of data processing functions from the host CPU to the remote storage device. The SoD-SSD may also provide higher-level features such as snapshot, replication, and virtual machine (VM) data migration services.

Although the various embodiments are described in terms of providing scalable storage capacity to the host, a person of skill in the art should recognize that the various embodiments are not limited thereto, but may expand to other types of storage resources such as, for example, storage processing capabilities, and/or the like.

FIG. 1 depicts a block diagram of a storage system 100 including a host computing device 102 connected to one or more local storage devices 104 over a data communications link 106. The host device 102 may issue commands or requests to the local storage device 104 over the data communications link 106, and may receive responses from the local storage device 104 over the link. In some embodiments, the requests include requests for storage capacity. In some embodiments, the requests include data storage commands such as commands to write/store data, read/load data, erase data, and/or the like. The responses may include acknowledgment that the requested storage capacity has been configured. The responses may include data retrieved from the local storage device 104 in response to a command to read/load data, and/or a notification of completion of a storage command.

The data request commands including the read or write commands may be generated by an application running on the host device 102. For example, the application may be a big data analysis application, e-commerce application, database application, machine learning application, and/or the like. Results of the data request may be used by the application to generate an output.

The host device 102 may include a host processor 108 and host memory 110. The host processor 108 may be a processing circuit, for example, such as a general purpose processor or a central processing unit (CPU) core of the host device 102. The host processor 108 may be connected to other components via an address bus, a control bus, a data bus, and/or the like. The host memory 110 may include (or may be) volatile memory, for example, such as dynamic random-access memory (DRAM). However, the present disclosure is not limited thereto, and the host memory 210 may include (or may be) any suitable high performing main memory (e.g., primary memory) replacement for the host device 102 as would be known to those skilled in the art. For example, in other embodiments, the host memory 110 may be relatively high performing non-volatile memory, such as NAND flash memory, Phase Change Memory (PCM), Resistive RAM, Spin-transfer Torque RAM (STTRAM), any suitable memory based on PCM technology, memristor technology, and/or resistive random access memory (Re-RAM), and can include, for example, chalcogenides, and/or the like.

The local storage device 104 (also referred to as an SOD SSD) may be any storage device configured to persistently store data and provide such data to the host device 102. In some embodiments, the local storage device 104 is a directly attached storage (DAS), such as, for example, an SSD. In some embodiments, the local storage device 104 is attached to the host device 102 (e.g., directly), via the data communications link 106, without going through a network. In this regard, the data communications link 106 (e.g., the connector and the protocol thereof) may include (or may conform to) a PCIe interface that implements an NVMe protocol, although embodiments are not limited thereto. For example, the data communications link 106 (e.g., the connector and the protocol thereof) may include (or conform to) a Compute Express Link (CXL), Cache Coherent Interconnect for Accelerators (CCIX), dual in-line memory module (DIMM) interface, Small Computer System Interface (SCSI), Peripheral Component Interconnect Express (PCIe), remote direct memory access (RDMA) over Ethernet, Serial Advanced Technology Attachment (SATA), Serial Attached SCSI (SAS), and/or the like. In some embodiments, the data communications link 106 (e.g., the connector and the protocol thereof) may include (or may conform to) various general-purpose interfaces, such as, for example, a Universal Serial Bus (USB).

In some embodiments, the local storage device 104 communicates with one or more backend remote storage devices 120a-120c (collectively referenced as 120) over a data communications network 122. In some embodiments, the data communications network 122 includes a local area network, wide area network, and/or public Internet.

In some embodiments, the local storage device 104 acts as an NVMe-oF Initiator on the backend, accessing block storage over a fabrics. The local storage device 104 may perform read and write operations from and to the remote storage devices 120 using, for example, the NVMe-oF protocol, although embodiments are not limited thereto. In this regard, the network fabric used by the data communications network (e.g., connections and protocols thereof) may include fiber channel (NVMe/FC), TCP (NVMe/TCP), RDMA supporting InfiniBand, Converged Ethernet (RoCE), Internet Wide Area RDMA Protocol (iWARP), and/or any other NVMe-OF transport protocol as will be appreciated by a person of skill in the art.

In some embodiments, the remote storage devices 120 include disaggregated storage nodes including one or more of Ethernet Bunch of Flash (EBOF) using ESSDs (Ethernet SSD), Just a Bunch of Flash (JBOF), Just a Bunch of Drives (JBOD), and/or other collection of flash or drives that may be accessed using the NVMe-oF protocol in an RDAS manner. One or more of the remote storage devices 120 may be used for allocating the requested storage capacity to the host 102. In some embodiments, the remote storage devices 120 may include or be associated with a controller and/or switch for processing or distributing storage commands (e.g., read, write, erase, etc.) and associated responses, between the remote storage devices 120 and the local storage device 104.

In some embodiments, the local storage device 104 includes a storage controller 112, storage memory 114, non-volatile memory (NVM) 116, and a storage interface 118. The storage controller 112 may include at least one processing component embedded thereon for interfacing with one or more components of the storage system 100. The processing component may include, for example, a digital circuit (e.g., a microcontroller, a microprocessor, a digital signal processor, or a logic device (e.g., a field programmable gate array (FPGA), an application-specific integrated circuit (ASIC), and/or the like)) capable of processing one or more storage related commands or requests (e.g., via firmware and/or software). For example, the request may be for storage capacity. In some examples, the commands are I/O commands from the host (e.g., read/load, write/store, erase, etc.).

The storage memory 114 may be high-performing memory of the local storage device 104, and may include (or may be) volatile memory, for example, such as DRAM, but the present disclosure is not limited thereto, and the storage memory 114 may be any suitable kind of high-performing volatile or non-volatile memory.

The NVM 116 may include, for example, NAND flash memory, but the present disclosure is not limited thereto, and the NVM 116 may include any suitable kind of memory for persistently storing the data according to an implementation of the local storage device 104 (e.g., phase-change memory (PCM), conductive-bridging random access memory (CBRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like). In some embodiments, the NVM 116 is of a fixed capacity.

The storage controller 112 may be connected to the NVM 116 over the storage interface 118. The storage interface 118 may be an interface with which the NVM 116 (e.g., NAND flash memory) may communicate with a processing component (e.g., the storage controller 112) or another device. The storage controller 112 may manage the storage interface 118 to control, and to provide access to and from, the NVM 116.

In some embodiments, the storage controller 112 uses the storage memory 114 and/or NVM 116 as a local cache buffer. The cache policy that is used to manage the cache may be one of a least recently used (LRU) algorithm, least frequently used (LFU) algorithm, segmented LRU (SLRU) algorithm, last in first out (LIFO) algorithm, first in last out (FILO) algorithm, time aware least recently used (TLRU) algorithm, and/or the like. The storage controller 112 may select the cache policy based on one or more criteria including, for example, host identifier (ID), queue ID (e.g., a submission queue ID), logical block address (LBA) range, day/time, SLA, and/or the like.

In some embodiments, the storage controller 112 uses the local cache buffer for burst buffering. Burst buffering may be desirable to account for bandwidth/throughput difference between the data communications link 106 (e.g., an NVMe interface) to the host 102, and a remote network interface 124 (e.g., an NVMe-oF interface) to the data communications network 122. For example, the local storage device 104 may have an NVMe interface of Gen4×8 (16 GB/s) while the NVMe-oF interface may be 100 Gb/s (8 GB/s).

In some embodiments, the storage system 100 includes a storage management server (SMS) 126 in communication with the local storage device 104 and the remote storage devices 120. The SMS 126 may include a processor and memory configured to provide and manage subscription services for a user or client associated with the host 102. The subscription services provided by the SMS 126 may allow the client to enroll in a SoD service plan. The SMS 126 may further charge the client based on the capacity that is allocated and/or used according to the selected service plan and associated pricing details.

In some embodiments a storage administrator accesses the SMS 126 over the data communications network 122 (e.g., the public Internet) to enroll the client in a SoD service plan. The administrator may select from one or more available plans including a pay-as-you-go plan, a fixed capacity plan, and/or the like.

In some embodiments, the pay-as-you-go plan allows the host 102 to pay for the storage capacity that it uses, without worrying about actual capacity. In this regard, the local storage device 104 may present or advertise infinite storage capacity to the host 102. The host 102 may issue read and write commands to the local storage device 104, without adhering to the constraints of the physical capacity provided by the local storage device (e.g., the NVM 116). The local storage device 104 may perform the necessary functions to ensure that the host 102 receives the requested amount of storage from the remote storage devices 120. For example, the local storage device 104 may connect to the SMS 126 to request capacity needed by the host 102, and receive the access details of the allocated storage capacity from the SMS 126. The SMS 126 may charge the client based on the amount of capacity used by the host during a charge period (e.g., second, minute, hour, day, week, month, year, etc.).

In some embodiments, an allocated capacity may no longer be needed by the host 102. For example, the host 102 may detect that a file has been deleted from the file system. In this case, the host 102 may send a command (e.g., a "trim," "deallocate," or "delete" command) to the local storage device 104 to free the allocated memory space. The local storage device 104 may in turn forward the command to the controllers in the affected remote storage devices 120, for freeing the associated storage. The SMS 126 may also receive a notification for adjusting billing parameters based on the reduced used of the storage capacity. In some embodiments, the SoD SSD 104 captures various host storage usage statistics and makes them available to the SMS 126 periodically for billing purposes.

In some embodiments, the fixed capacity plan gives the client an option to subscribe to a fixed amount of capacity (e.g., 100 GB, 1 TB, 10 TBs, etc.) for a given period of time (e.g., second, minute, hour, day, week, month, year, etc.).

The fixed amount of capacity is advertised to the host 102 as accessible capacity. In some embodiments, the host 102 many not exceed the fixed amount of capacity that has been allocated to the host during the given time period. As the storage needs of the host 102 goes up or down, the storage administrator may access the SMS to modify the subscription plan to a higher or lower capacity.

In some embodiments the SMS 126 selects one or more of the remote storage devices 120 to fulfill the capacity requested by the host 102. Selection of the remote storage devices 120 may be based on a criterion. The criterion may include, without limitation, availability of storage space in the one or more remote storage devices 120, QoS levels, SLA parameters requested by the client, date, time, availability of the remote storage resources, geographic location of the clients, current health state of the remote storage devices 120, and/or the like. For example, some users may be identified as having write heavy workloads. In this case, the SMS 126 may select a higher endurance capable storage device. In another example, some users may be identified as tolerating higher latencies. In that case, the SMS 126 may select a lower performance storage device.

Once allocated, the SMS 126 may transmit access details of the storage capacity to the local storage device 104. For example, the SMS 126 may transmit a network address of the remote storage devices 120 providing the requested capacity, details of a storage controller associated with the remote storage devices, network path information, namespace ID of the allocated storage space, allocated address range (e.g., LBA range), and/or the like. The local storage device 104 may use the access information to perform read and write operations from and to the remote storage devices 120.

In some embodiments, the SMS 126 maintains a subscription account for the client based on the selected plan. The subscription account may include details on the type of SoD service plan enrolled by the user (e.g., subscription ID), information on the host device (e.g., host ID) receiving the allocated capacity, authentication details (e.g., pin code), pricing details, SLAs, and/or the like. One or more of the subscription information may be provided to the host 102 and/or local storage device 104. In some embodiments, the SMS 126 performs other administrative functions including monitoring the amount of storage capacity allocated to and/or used by the host 102, generating invoices, and/or the like.

In some embodiments, the storage device 104 is inside a slot of a chassis (not shown) that includes a baseboard management controller (BMC) 128. The BMC 128 may discover, configure, initialize, and monitor one or more devices on the chassis, including the local storage device 104. In some embodiments, the BMC 128 receives subscription details including, for example, the subscription ID, host ID, authentication information, and/or the like, upon the client enrolling in an SOD service plan. In some embodiments, the BMC 128 identifies the storage capacity needed by the applications on the host 102, and requests and configures the appropriate capacity to the local storage device 104 by providing to the device the subscription details. Such BMC and SoD SSD communication may occur on out-of-band or in-band management interfaces such as I2C, SMBus, PCIe etc. and management protocols such as NVMe-MI, Redfish, Swordfish, RED etc.

Figure 2:
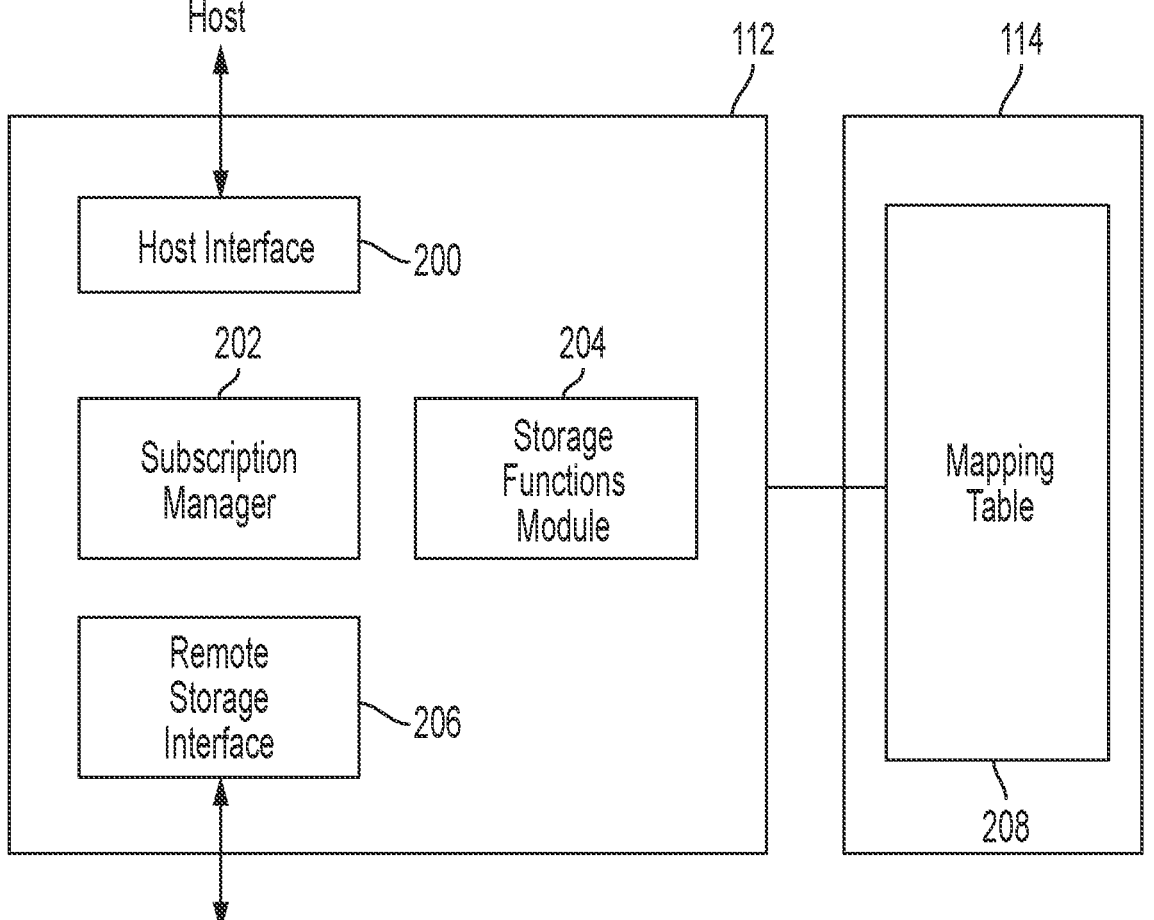
FIG. 2 depicts a block diagram of a storage controller and a storage memory of a local storage device according to one or more embodiments.

FIG. 2 depicts a block diagram of the storage controller 112 and the storage memory 114 of the local storage device 104 according to one or more embodiments. In some embodiments, the storage controller 112 includes a host interface 200, subscription management module (referred to as a subscription manager) 202, storage functions module 204, and a remote storage interface 206. Although the subscription manager 202 and storage functions module 204 are assumed to be separate functional units, a person of skill in the art will recognize that the functionality of the subscription manager 202 and the storage functions module 204 may be combined or integrated into a single module, or further subdivided into further sub-modules without departing from the spirit and scope of the inventive concept.

In some embodiments, the host interface 200 includes connectors and required instructions (e.g., software or firmware) for receiving I/O commands from the host 102, and transmitting responses based on the commands. For example, the command may be a data write command, and the response may be notification that the command has been successfully executed. In some embodiments, the commands and responses are exchanged using a protocol such as, for example, the NVMe protocol.

The remote storage interface 206 may include connectors and required instructions (e.g., software or firmware) for communicating with the remote storage devices 120 over the data communications network 122. In some embodiments, the remote storage interface 206 employs the NVMe-oF protocol. In communicating with the remote storage devices 120 using the NVMe-oF protocol, the remote storage interface 206 may function as an NVMe-oF initiator that encapsulates a storage command (e.g., an NVMe command) into a network packet that is addressed to a network address associated with the remote storage devices 120.

In some embodiments, the subscription manager 202 is configured to receive a request for storage capacity from the host 102 or BMC 128 (e.g., via the host interface 200), and communicate with the SMS 126 for allocating the requested capacity. For example, the subscription manager 202 may transmit a request for the capacity to the SMS 126. The request may include client details such as, for example, the host ID and/or other authentication information (e.g., pin number). The subscription manager 202 may receive details of the allocated capacity from the SMS 126. Such details may include, for example, a remote network address to the remote storage device 120. In some embodiments, the subscription manager 202 monitors usage statistics for the allocated capacity, and forwards the usage statistics to the SMS 126 (e.g., for billing purposes).

In some embodiments, the storage memory 114 maintains a mapping table 208 that identifies the physical addresses of the allocated storage capacity. For example, if the host 102 requests for 100 TB of capacity, 0-100 TB of capacity is mapped to 0-100 TB of capacity across one or more of the remote storage devices 120. In some embodiments, the mapping table 208 is populated with the physical addresses (e.g., LBA addresses) corresponding to 0-100 TB of host capacity. The mapping table 208 may further contain the network addresses for accessing the remote storage device 120 associated with the physical address. In this regard a composable storage may be provided where multiple storage capacities provided by multiple storage devices 120 may be aggregated into a single logical host capacity.

The local storage device 102 may access the mapping table 208 in response to an I/O command from the host 102. For example, the host 102 may issue a read command identifying a host address (e.g., a logical address) of the data to be retrieved. The local storage device 102 may identify a physical address (e.g., LBA) associated with the host address. The local storage device 102 may transmit a command to a corresponding remote storage device 120 to read the data associated with the physical address.

In some embodiments, the visibility on the allocated physical addresses across the remote storage devices allows the local storage device 104 to perform operations in addition to read or write operations typical for a storage device. In this regard, the storage function module 204 may be configured with instructions to perform one or more of the additional operations.

In some embodiments, the additional operations performed by the storage function module 204 may relate to QoS, data access, data buffering, RAID protection, data security, and/or acceleration functions. For example, the storage functions module 204 may be configured to provide a different QoS parameter or a different cache policy based on the host ID, subscription plan, SLA parameter, and/or the like. For example, the identified QoS parameter may determine the remote storage device 120 that is selected for fulfilling the capacity requested by the host 102.

In some embodiments, the storage functions module 204 is configured to implement RAID protection for the data stored in the remote storage devices 120. In this regard, the mapping table 208 gives the storage functions module 204 visibility on how storage capacity is allocated in the remote storage devices. The storage functions module 204 may leverage this information to orchestrate and perform RAID schemes such as RAID0, RAID1, RAID5, RAID6, RAID10, and/or the like. For example, the storage functions module 204 may be configured to stripe data across multiple ones of the remote storage devices 120, perform data integrity or data protection schemes, and/or the like.

In some embodiments, the storage functions module 204 is configured to perform data security operations such as data encryption/decryption before/after data is stored on the remote storage devices 120. The data security operation may be performed on a per command basis using protocols such as a key per IO (KPIO), transport layer security (TLS), and/or the like.

In some embodiments, the storage functions module 204 is configured to perform one or more computational storage functions such as compression, checksums, acceleration, and/or data queries (e.g., using file, object, and/or key/value protocols). A processing function (e.g., a computation of data stored across the remote storage devices) may also be offloaded by the host processor 108 to the storage functions module 204 for execution thereon.

In some embodiments, the storage functions module 204 may be configured to provide higher-level features such as snapshot, replication, and VM data migration services. For example, if the client has enrolled to receive a snapshot service, the storage functions module 204 may transmit a command to take a snapshot (e.g., perform a copy) of the data stored in the currently allocated addresses identified via the mapping table 208, to different addresses of the remote storage devices 120. In some embodiments, the higher-level features are performed on a periodic basis (e.g., on a daily or weekly basis) by the storage functions module 204. Performing the features by the local storage device 104 (e.g., as a background process) may free the host 102 from expending its resources in performing the features.

Figure 3:
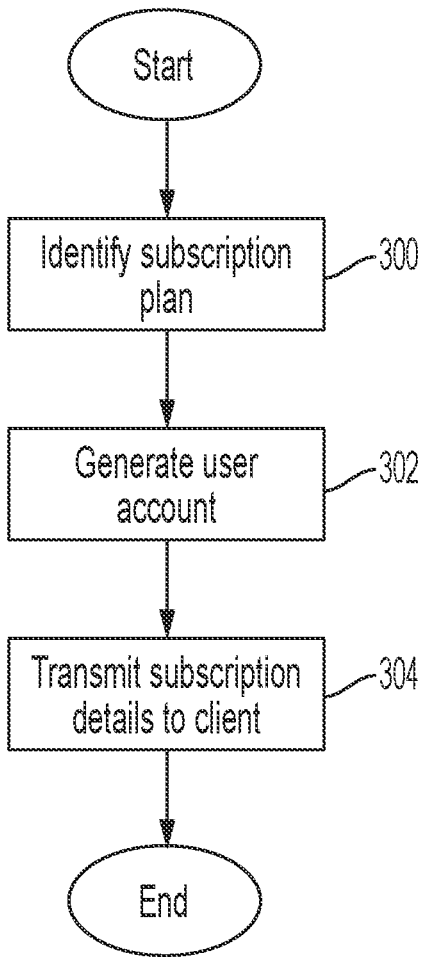
FIG. 3 depicts a flow diagram of a process for enrolling a client in a storage-on-demand service plan according to one or more embodiments.

FIG. 3 depicts a flow diagram of a process for enrolling a client in a SoD service plan according to one or more embodiments. The process starts, and in act 300, the SMS 126 identifies a subscription plan selected by a client (e.g., via a communication received from the client). In this regard, a client interested in receiving scalable, on-demand storage capacity, may initiate communication with the SMS 126 (e.g., via a web browser), and select an SoD service plan from among one or more available service plans. The available service plans may include for example, a fixed capacity plan on a charge time basis (e.g., 100 GB/hour, 10 TB/day, etc.), a pay-as-you-go-plan, and/or the like.

In act 302, the SMS server 126 generates a user profile based on the selected plan. The user profile may include information about the client and subscription details, such as, for example, type of SoD service plan(s) enrolled by the user (e.g., subscription ID), information on the host device (e.g., host ID) receiving the allocated capacity, authentication details (e.g., pin code), pricing details, SLAs, and/or the like. In some embodiments, the user account includes an allocation meter for monitoring allocation of capacity to the client.

In act 304, the SMS server 126 transmits the subscription details to client. In some embodiments, the client provides all or portion of the subscription details, including the amount of subscribed storage capacity, authentication information, and/or address of the SMS 126, to the local storage device 104 (e.g., via the BMC 128). In some embodiments, the local storage device 104 advertises an accessible storage capacity to the host 102, based on the enrolled subscription. For example, if the client has enrolled in a fixed capacity plan, the local storage device 104 may advertise the fixed capacity as the capacity accessible to the host. If the client has enrolled in the pay-as-you-go plan, the local storage device 104 may advertise an infinite capacity to the host.

In some embodiments, the client may change the type of subscription based on changing needs. For example, if the capacity demand of the host 102 increases or decreases, the client may access the SMS 126 to switch to a higher or lower fixed capacity plan. The client may also change from a fixed capacity plan, to a pay-as-you-go plan, and vice versa.

Figure 4:
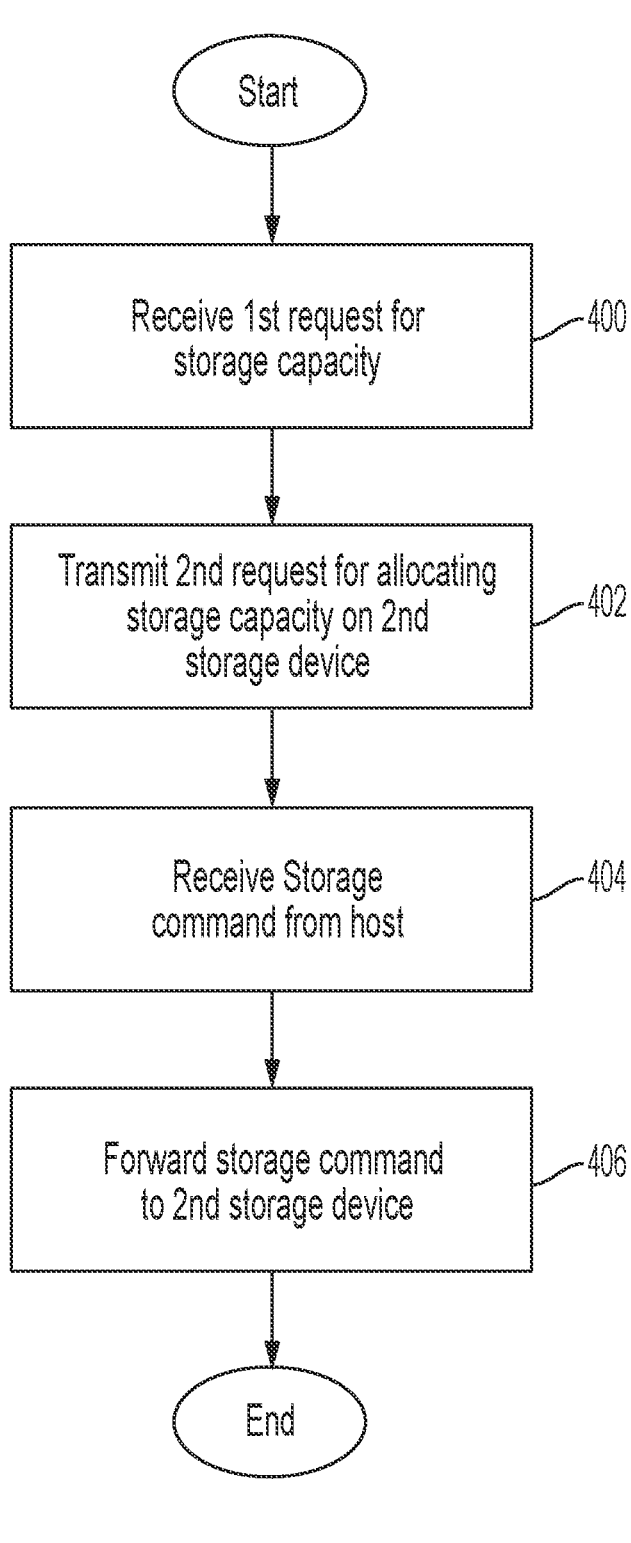
FIG. 4 depicts a flow diagram of a process for receiving on-demand storage capacity according to one or more embodiments.

FIG. 4 depicts a flow diagram of a process for receiving on-demand storage capacity according to one or more embodiments. The process starts, and in act 400, the local storage device 104 (e.g., the subscription manager 202) receives a first request for storage capacity. The request may be from the BMC 128 or the host 102 (collectively referenced as a computing device) based on an anticipated need for the capacity based on one or more applications configured on the host 102.

In act 402, the local storage device 104 (e.g., the subscription manager 202), transmits a second request for allocating at least a portion of the storage capacity on the second storage device. The second request may include, for example, the requested storage capacity along with authentication information of the host 102 (e.g., host ID, pin number, identification string, and/or the like). The SMS 126 may select one or more of the remote storage devices 120 to allocate the requested capacity. In this regard, the SMS 126 may identify the remote storage device(s) with available capacity, and allocate the requested storage capacity from the available pool of storage devices. The SMS 126 may further provide access details to the allocated capacity, to the local storage device 104. The access details may include, for example, a network address (e.g., TCP/IP Ethernet address or the like) of the remote storage device where capacity has been allocated.

In some embodiments, in the event that the host 102 cannot be authenticated (e.g., the client is not enrolled in a plan or the authentication information stored in the user profile differs from the received information), the SMS 126 rejects the request and transmits a message indicating the reason for rejection. In some embodiments, the rejection is made by the local storage device 104 based on information maintained by the subscription manager 202. The local storage device may generate an error code based on the rejection.

In some embodiments, an application running on the host processor 108 accesses the allocated storage capacity during runtime. In this regard, in act 404, the local storage device (e.g., the storage controller 112) receives a storage command (e.g., a read or write command) during execution of the application.

In act 406, the storage controller 112 forwards the command to the one or more remote storage devices 120. In some embodiments, the remote storage interface 206 of the storage controller converts the command into a second command. For example, the command may be encapsulated into a network packet for generating the second command. In some embodiments, the command adheres to the NVMe protocol, and the second command adheres to the NVMe-oF protocol. The second command may be received by the one or more remote storage devices 120 for reading or storing data as requested by the read or write command.

Figure 5:
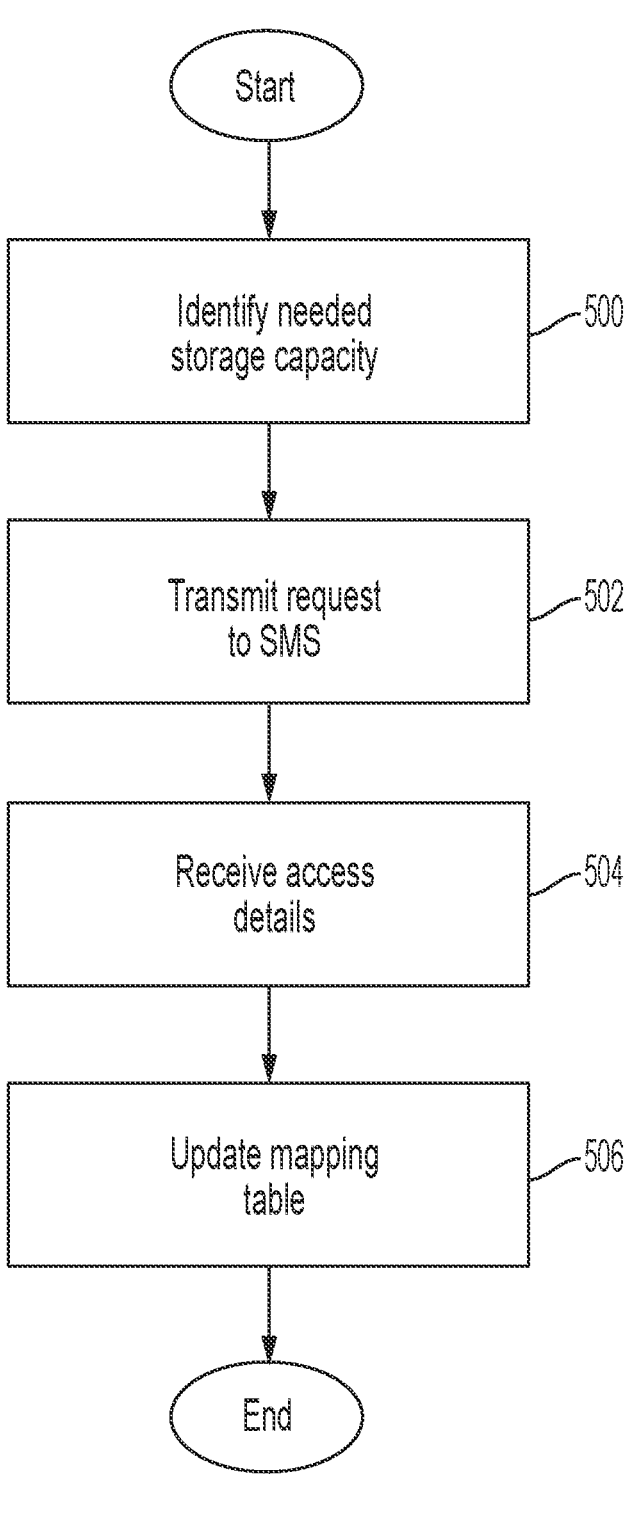
FIG. 5 depicts a flow diagram of a process for allocating storage capacity for use by a host according to one or more embodiments.

FIG. 5 depicts a flow diagram of a process for allocating storage capacity for use by the host 102 according to one or more embodiments. The process starts, and in act 500, the BMC 128 or host 102 identifies the storage capacity needed by one or more applications configured on the host 102. The BMC 128 or host 102 may make a request for the identified capacity to the local storage device 104.

In act 502, the local storage device 104 (e.g., the subscription manager 202) transmits a request for the storage capacity to the SMS 126. In this regard, the local storage device 104 transmits the request along with user authentication information. The user authentication information may include a host ID, pin number, identification string, and/or the like. The SMS 126 allocates the requested storage capacity across the one or more remote storage devices 120 upon authenticating the user information.

In act 504, the local storage device 104 receives access details of the allocated storage capacity from the SMS 126. The access details may include, for example, a network address (e.g., TCP/IP Ethernet address or the like) of the remote storage device where capacity has been allocated, the allocated address range, and/or the like.

In act 506, the local storage device 104 updates the mapping table 208 in the storage memory 114, with the physical addresses and access details of the allocated storage capacity.

In some embodiments, the process of FIG. 5 applies to the fixed capacity plan and the pay-as-you-go plan. For example, in the pay-as-you-go plan, the SoD SSD may keep some remote storage allocation details in the mapping table, and keep allocating or deallocating additional remote capacity as time goes on based on host usage.

Figure 6:
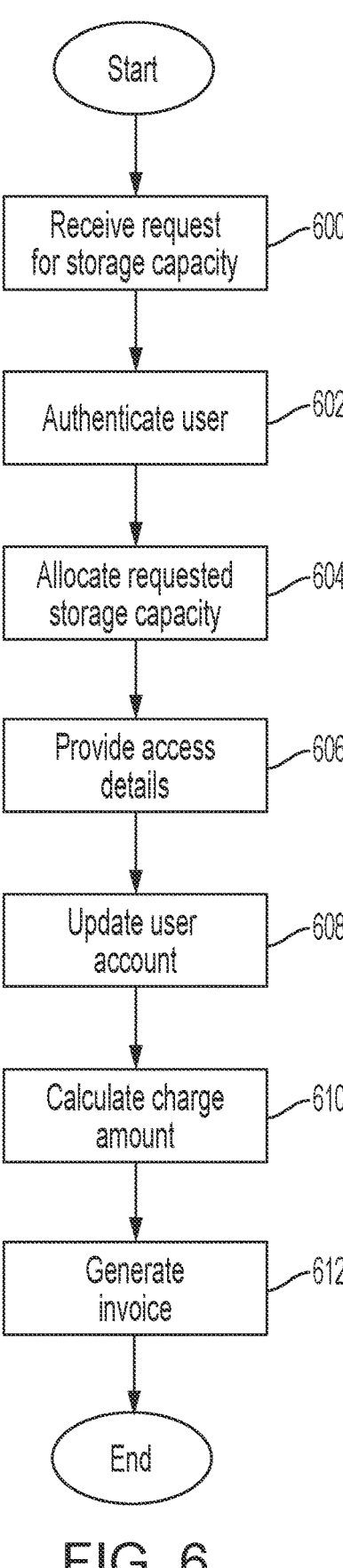
FIG. 6 depicts a flow diagram of a process for providing and managing storage-on-demand according to one or more embodiments.

FIG. 6 depicts a flow diagram of a process for providing and managing storage-on-demand according to one or more embodiments. The process starts, and in act 600, the SMS 126 receives a request for storage capacity from the host 102. The request may include user details such as, for example, a host ID.

In act 602, the SMS 126 authenticates the user details based on the user account stored in the SMS.

In act 604, the SMS 126 selects one or more of the remote storage devices 120 to provide the requested capacity, and allocates the requested capacity on the selected remote storage devices.

In act 606, the SMS 126 provides access details to the allocated storage capacity to the local storage device 104. The access details may include, for example, a network address for accessing the remote storage device 120, details of a storage controller associated with the remote storage device, network path information, namespace ID of the allocated capacity, allocated address range (e.g., LBA range), and/or the like.

In act 608, the SMS 126 updates the user account with the allocation information.

In act 610, the SMS 126 may calculate a charge or invoice amount for a charge period (e.g., hour, day, week, month), based on the allocated amount and the pricing of the subscription.

In act 612, an invoice is generated (e.g., by the SMS 126 or another accounting server) based on the calculated charge amount.

In the embodiments where the client has enrolled in a pay-as-you-go service plan (as indicated in the client profile), the SMS 126 is configured to monitor usage of the allocated capacity, and adjust the charge amount based on the usage by an application running on the host 102. For example, the application may use 100 GB capacity for some time, then reduce the usage to 10 GB for the next few days, and later increase usage to 1 TB for a month. The SMS 126 may calculate the amount to be charged for the various capacity levels at some time granularity. The charge time granularity can be second, hour, minute, day, week, month, year, or the like. In some embodiments, the SoD SSD device 104 captures host storage usage statistics such as capacity, bandwidth during application runtime and provides that statistics to SMS server 126 for billing purposes.

In some embodiments, when the host 102 no longer needs a certain capacity, it may issue a command to the local storage device 104 to delete certain files or data. The local storage device 104 may access the mapping table 208 to identify the physical blocks associated with the deleted files or data, and issue a command to the affected remote storage devices 120 to free or erase data in the identified physical blocks. The SMS 126 may also receive a notification for adjusting billing parameters. For example, the SMS 126 may decrease the amount of usage by the host 102 based on the deleted physical blocks, and charge the client based on the decreased amount of usage.

Figure 7:
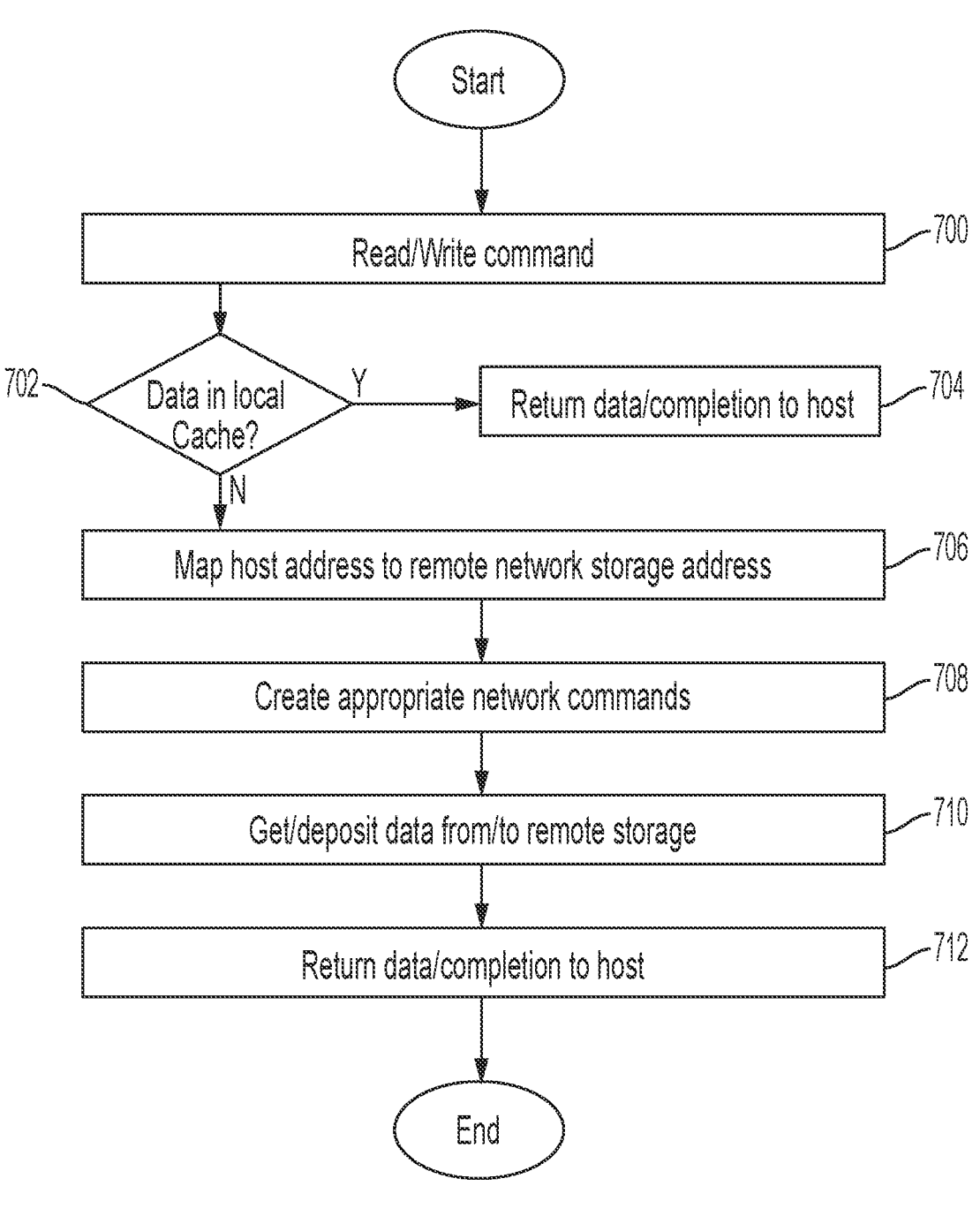
FIG. 7 depicts a flow diagram of a process for processing read or write commands from a host according to one or more embodiments.

FIG. 7 depicts a flow diagram of a process for processing read or write commands from the host 102 according to one or more embodiments. The process starts, and in act 700, the storage controller 112 receives a read or write command from the host 102, via the host interface 200. The read or write command may be, for example, an NVMe command.

In act 702, the storage controller 112 determines whether the data is stored in the local cache buffer (e.g., the storage memory 114 or NVM 116). If the answer is YES, the storage controller 112 retrieves the data from the local cache buffer (for a read command), or transmits a completion message to the host (for a write command), in act 704.

If, however, the data is not stored in the local cache buffer, the storage controller 112 accesses the mapping table 208 to map the logical address in the read or write command, to a remote network storage address.

In act 708, the storage controller (e.g., via the remote storage interface 206) generates a second command for transmitting the read or write command to an appropriate remote storage device 120. The second command may be, for example, an NVMe-oF command. In this regard, the second command may encapsulate the read or write command into an NVMe-OF network packet that is addressed to the retrieved remote network storage address. The packet may be transmitted to the remote storage device 120 over the data communications network 122. In some embodiments, one host command results in multiple second commands to the remote storage.

In act 710, the remote storage device 120 receives the network packet, and retrieves or stores data from or to a physical address in the remote storage device 120 according to the command in the network packet.

In act 712, the remote storage device 120 returns the retrieved data or transmits a completion message to the local storage device 104, and the local storage device 104 forwards the received data or message to the host 102.

In some embodiments, the storage controller 112 performs other functions before storing data to the remote storage device 120, or returning data retrieved from the remote storage device 120, to the host 102. Such functions may include, for example, encryption/decryption, compression, computation, RAID protection, buffering, and/or the like. The additional processing may be based on instructions executed by the storage functions module 204.

One or more embodiments of the present disclosure may be implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for scalable storage have been specifically described and illustrated herein, many modifications and variations will be apparent to those skilled in the art. Accordingly, it is to be understood that systems and methods for scalable storage constructed according to principles of this disclosure may be embodied other than as specifically described herein. The disclosure is also defined in the following claims, and equivalents thereof.

The systems and methods for processing storage transactions may contain one or more combination of features set forth in the below statements.

Statement 1. A first storage device coupled to a first computing device over a first link, the first storage device comprising: a storage medium; and a processing circuit connected to the storage medium, the processing circuit being configured to: receive a first request for a first storage capacity; transmit a second request for allocating at least a portion of the first storage capacity on a second storage device configured to communicate with the first storage device over a second link; receive a first storage command from the first computing device; generate a second storage command based on the first storage command; and transmit the second storage command to the second storage device for execution of the second storage command by the second storage device.

Statement 2. The first storage device of Statement 1, wherein the first storage device includes a solid state drive (SSD), and the first link includes a data communication bus.

Statement 3. The first storage device of Statement 1, wherein the second storage device is shared with the first computing device and a second computing device, wherein the second link includes a connection to a network fabric.

Statement 4. The first storage device of Statement 1, wherein the processing circuit is further configured to: receive an address of the second storage device based on the second request, wherein the processing circuit being configured to transmit the second storage command includes the processing circuit being configured to transmit the second storage command based on the address.

Statement 5. The first storage device of Statement 1, wherein the first storage device and the second storage device are configured to communicate with a server, wherein the server is configured to: receive a communication associated with the first computing device; generate a profile based on the communication; and detect allocation of the first storage capacity to the first computing device based on the profile.

Statement 6. The first storage device of Statement 5, wherein the processing circuit is configured to: detect an amount of use of the at least the portion of the first storage capacity; and transmit the amount of use to the server, wherein the server is configured to generate a second communication based on the amount of use.

Statement 7. The first storage device of Statement 1, wherein the processing circuit is configured to: receive a second request for a second storage capacity different from the first storage capacity; and compute a second charge amount for the second storage capacity.

Statement 8. The first storage device of Statement 7, wherein the processing circuit is configured to transmit the second request to a server, wherein the server is configured to: authenticate the first computing device; and select the second storage device for allocating the first storage capacity on the second storage device for use by the first computing device.

Statement 9. The first storage device of Statement 8, wherein the server is configured to communicate with a third storage device, wherein the server is configured to select the second storage device and the third storage device for allocating the first storage capacity on the second storage device and the third storage device.

Statement 10. The first storage device of Statement 1, wherein the processing circuit is configured to provide information on accessible storage capacity to the first computing device that is larger than a size of the storage medium.

Statement 11. The first storage device of Statement 1, wherein the first storage command includes a logical address, and the processing circuit is configured to map the logical address to a physical address in the second storage device.

Statement 12. The first storage device of Statement 1, wherein the processing circuit is configured to: receive data associated with the first storage command; store the data in the storage medium; and transmit the data from the storage medium to the second storage device.

Statement 13. The first storage device of Statement 1, wherein the processing circuit is configured to provide a function including at least one of a quality of service function, a redundant array of independent disks (RAID) scheme, data security function, data processing function, acceleration function, data snapshot function, data replication function, or data migration function.

Statement 14. The first storage device of Statement 1, wherein the processing circuit is configured to: receive a second request for a second storage capacity; make an authentication determination for the first computing device; and generate a signal for the second request based on the authentication determination.

Statement 15. A method comprising: receiving, by a first storage device, over a first link, a first request for a first storage capacity; transmitting, by the first storage device, a second request for allocating at least a portion of the first storage capacity on a second storage device configured to communicate with the first storage device over a second link; receiving, by the first storage device, a first storage command from a first computing device; generating, by the first storage device, a second storage command based on the first storage command; and transmitting, by the first storage device, the second storage command to the second storage device for execution of the second storage command by the second storage device.

Statement 16. The method of Statement 15, wherein the first storage device includes a solid state drive (SSD), and the first link includes a data communication bus.

Statement 17. The method of Statement 15, wherein the second storage device is shared with the first computing device and a second computing device, wherein the second link includes a connection to a network fabric.

Statement 18. The method of Statement 15 further comprising: receiving an address of the second storage device based on the second request, wherein the transmitting the second storage command includes transmitting the second storage command based on the address.

Statement 19. The method of Statement 15, wherein the first storage device and the second storage device are configured to communicate with a server, wherein the server is configured to: receive a communication associated with the first computing device; generate a profile based on the communication; and detect allocation of the first storage capacity to the first computing device based on the profile.

Statement 20. The method of Statement 19 further comprising: detecting an amount of use of the at least the portion of the first storage capacity; and transmitting the amount of use to the server, wherein the server is configured to generate a second communication based on the amount of use.

Statement 21. The method of Statement 15 further comprising: receiving a second request for a second storage capacity different from the first storage capacity; and computing a second charge amount for the second storage capacity.

Statement 22. The method of Statement 21 further comprising: transmitting the second request to a server, wherein the server is configured to: authenticate the first computing device; and select the second storage device for allocating the first storage capacity on the second storage device for use by the first computing device.

Statement 23. The method of Statement 22, wherein the server is configured to communicate with a third storage device, wherein the server is configured to select the second storage device and the third storage device for allocating the first storage capacity on the second storage device and the third storage device.

Statement 24. The method of Statement 15 further comprising: providing, by the first storage device, information on accessible storage capacity to the first computing device that is larger than a size of a storage medium in the first storage device.

Statement 25. The method of Statement 15, wherein the first storage command includes a logical address, and the method further comprises mapping the logical address to a physical address in the second storage device.

Statement 26. The method of Statement 15 further comprising: receiving, by the first storage device, data associated with the first storage command; storing, by the first storage device, the data in a storage medium of the first storage device; and transmitting, by the first storage device, the data from the storage medium to the second storage device.

Statement 27. The method of Statement 15 further comprising: providing a function including at least one of a quality of service function, a redundant array of independent disks (RAID) scheme, data security function, data processing function, acceleration function, data snapshot function, data replication function, or data migration function.

Statement 28. The method of Statement 15 further comprising: receiving, by the first storage device, a second request for a second storage capacity; making, by the first storage device, an authentication determination for the first computing device; and generating, by the first storage device, a signal for the second request based on the authentication determination.

What is claimed is:

1. A first storage device coupled to a first computing device over a first link and a second computing device over a second link, the first storage device comprising:
    a storage medium; and
    a processing circuit connected to the storage medium, the processing circuit being configured to:
        receive, from the second computing device, information about accessible storage capacity, wherein the second computing device is configured to transmit the information based on identifying a service plan subscribed to on behalf of the first computing device;
        advertise the accessible storage capacity to the first computing device, wherein the accessible storage capacity advertised to the first computing device is greater than a capacity of the storage medium;
        receive from the first computing device, based on the information, a first request to allocate a first storage capacity;
        transmit a second request for allocating at least a portion of the first storage capacity on a second storage device configured to communicate with the first storage device over a second link, wherein the second storage device is configured to allocate the portion of the first storage capacity based on the second request;
        receive a first storage command from the first computing device;
        generate a second storage command based on the first storage command; and
        transmit the second storage command to the second storage device for execution of the second storage command by the second storage device, wherein the second storage device is configured to perform an input-output operation based on the second storage command.

2. The first storage device of claim 1, wherein the first storage device includes a solid state drive (SSD), and the first link includes a data communication bus.

3. The first storage device of claim 1, wherein the second storage device is shared with the first computing device and a second computing device, wherein the second link includes a connection to a network fabric.

4. The first storage device of claim 1, wherein the processing circuit is further configured to:
    receive an address of the second storage device based on the second request, wherein the processing circuit being configured to transmit the second storage command includes the processing circuit being configured to transmit the second storage command based on the address.

5. The first storage device of claim 1, wherein the first storage device and the second storage device are configured to communicate with a server, wherein the server is configured to:
    receive a communication associated with the first computing device;
    generate a profile based on the communication; and
    detect allocation of the first storage capacity to the first computing device based on the profile.

6. The first storage device of claim 5, wherein the processing circuit is configured to:
    detect an amount of use of the at least the portion of the first storage capacity; and
    transmit the amount of use to the server, wherein the server is configured to generate a second communication based on the amount of use.

7. The first storage device of claim 1, wherein the processing circuit is configured to:

receive a second request for a second storage capacity different from the first storage capacity; and compute a charge amount for the second storage capacity.

8. The first storage device of claim 7, wherein the processing circuit is configured to transmit the second request to a server, wherein the server is configured to:

authenticate the first computing device; and select the second storage device for allocating the first storage capacity on the second storage device for use by the first computing device.

9. The first storage device of claim 8, wherein the server is configured to communicate with a third storage device, wherein the server is configured to select the second storage device and the third storage device for allocating the first storage capacity on the second storage device and the third storage device.

10. The first storage device of claim 1, wherein the processing circuit is configured to provide information on accessible storage capacity to the first computing device that is larger than a size of the storage medium.

11. The first storage device of claim 1, wherein the first storage command includes a logical address, and the processing circuit is configured to map the logical address to a physical address in the second storage device.

12. The first storage device of claim 1, wherein the processing circuit is configured to:

receive data associated with the first storage command;

store the data in the storage medium; and transmit the data from the storage medium to the second storage device.

13. The first storage device of claim 1, wherein the processing circuit is configured to provide a function including at least one of a quality of service function, a redundant array of independent disks (RAID) scheme, data security function, data processing function, acceleration function, data snapshot function, data replication function, or data migration function.

14. The first storage device of claim 1, wherein the processing circuit is configured to:

receive a second request for a second storage capacity;

make an authentication determination for the first computing device; and generate a signal for the second request based on the authentication determination.

15. A method comprising:

receiving, by a storage device, from a second computing device, information about accessible storage capacity, wherein the second computing device is configured to transmit the information based on identifying a service plan subscribed to on behalf of a first computing device;

advertising, by the storage device, the accessible storage capacity to the first computing device, wherein the accessible storage capacity advertised to the first computing device is greater than a capacity of a storage medium of the storage device;

receiving, by first storage device from the first computing device, based on the information, over a first link, a first request to allocate a first storage capacity;

transmitting, by the first storage device, a second request for allocating at least a portion of the first storage capacity on a second storage device configured to communicate with the first storage device over a second link, wherein the second storage device allocates the portion of the first storage capacity based on the second request;

receiving, by the first storage device, a first storage command from a first computing device;

generating, by the first storage device, a second storage command based on the first storage command; and transmitting, by the first storage device, the second storage command to the second storage device for execution of the second storage command by the second storage device, wherein the second storage device performs an input-output operation based on the second storage command.

16. The method of claim 15, wherein the first storage device includes a solid state drive (SSD), and the first link includes a data communication bus.

17. The method of claim 15, wherein the second storage device is shared with the first computing device and a second computing device, wherein the second link includes a connection to a network fabric.

18. The method of claim 15 further comprising:

receiving an address of the second storage device based on the second request, wherein the transmitting the second storage command includes transmitting the second storage command based on the address.

19. The method of claim 15, wherein the first storage device and the second storage device are configured to communicate with a server, wherein the server is configured to:

receive a communication associated with the first computing device;

generate a profile based on the communication; and detect allocation of the first storage capacity to the first computing device based on the profile.

20. The method of claim 19 further comprising:

detecting an amount of use of the at least the portion of the first storage capacity; and transmitting the amount of use to the server, wherein the server is configured to generate a second communication based on the amount of use.

\* \* \* \* \*